United States Patent
Fish et al.

(10) Patent No.: US 11,321,460 B2
(45) Date of Patent: May 3, 2022

(54) INFORMATION REDISTRIBUTION TO REDUCE SIDE CHANNEL LEAKAGE

(71) Applicant: Bar-Ilan University, Ramat-Gan (IL)

(72) Inventors: Alexander Fish, Tel-Mond (IL); Osnat Keren, Rosh HaAyin (IL); Yoav Weizman, Kfar-Vitkin (IL); Matan Elkoni, Petach Tikva (IL)

(73) Assignee: Bar-Ilan University, Ramat-Gan (IL)

( * ) Notice: Subject to any disclaimer, the term of this patent is extended or adjusted under 35 U.S.C. 154(b) by 83 days.

(21) Appl. No.: 17/002,807

(22) PCT Filed: Feb. 28, 2019

(86) PCT No.: PCT/IL2019/050230
§ 371 (c)(1),
(2) Date: Aug. 26, 2020

(87) PCT Pub. No.: WO2019/167050
PCT Pub. Date: Sep. 6, 2019

(65) Prior Publication Data
US 2021/0200865 A1 Jul. 1, 2021

Related U.S. Application Data

(60) Provisional application No. 62/636,238, filed on Feb. 28, 2018.

(51) Int. Cl.
*G06F 21/55* (2013.01)
*G06F 21/75* (2013.01)
(Continued)

(52) U.S. Cl.
CPC .......... *G06F 21/556* (2013.01); *G06F 21/755* (2017.08); *H03K 19/0948* (2013.01);
(Continued)

(58) Field of Classification Search
CPC .............. G06F 21/556; G06F 21/755; G06F 2221/034; G06F 21/75; H03K 19/0948;
(Continued)

(56) References Cited

U.S. PATENT DOCUMENTS 6,356,117 B1 * 3/2002 Sutherland ................ G06F 7/00
326/93
6,433,584 B1 8/2002 Hatae
(Continued)

FOREIGN PATENT DOCUMENTS

| DE | 102014009808 | 1/2016 |
|---|---|---|
| EP | 1924023 | 5/2008 |

(Continued)

OTHER PUBLICATIONS

Final Official Action dated Sep. 16, 2020 from the US Patent and Trademark Office Re. U.S. Appl. No. 16/313,901. (11 pages).
(Continued)

*Primary Examiner* — Daniel D Chang (57) ABSTRACT

A logic circuit includes a data signal input, a computational module, a direct timing modulator and an amplitude and non-direct timing modulator. The data signal input inputs data signals. The computational module includes multiple logic elements interconnected to perform a logic function. The direct timing modulator modulates a propagation time of the input data signals from the data signal input to the computational unit, in accordance with a first set of control signals. The amplitude and non-direct timing modulator modulates the processing time of data signals by the computational module and the amplitude of data signals propagating through the computational module, in accordance with a second set of control signals.

18 Claims, 9 Drawing Sheets

(51) Int. Cl.
  *H03K 19/0948* (2006.01)
  *H04L 9/00* (2022.01)
  *H03K 3/84* (2006.01)
  *H03K 17/687* (2006.01)

(52) U.S. Cl.
  CPC ........ *H04L 9/003* (2013.01); *G06F 2221/034* (2013.01); *H03K 3/84* (2013.01); *H03K 17/6872* (2013.01)

(58) Field of Classification Search
  CPC ...... H03K 3/84; H03K 17/6872; H04L 9/003; H04L 2209/12; H04L 9/0852
  See application file for complete search history.

(56) References Cited

U.S. PATENT DOCUMENTS

| | | | |
|---|---|---|---|
| 6,483,165 B2* | 11/2002 | Ooishi | G11C 5/147 257/499 |
| 6,545,507 B1 | 4/2003 | Goller | |
| 7,127,620 B2 | 10/2006 | Boeckeler | |
| 7,492,849 B2 | 2/2009 | On et al. | |
| 7,590,880 B1 | 9/2009 | Hershman | |
| 7,660,364 B2 | 2/2010 | Sandner et al. | |
| 7,694,242 B1 | 4/2010 | Li et al. | |
| 7,907,722 B2 | 3/2011 | Timmermans | |
| 8,296,704 B1 | 10/2012 | Kipprer et al. | |
| 8,352,235 B1 | 1/2013 | Lin et al. | |
| 9,209,960 B1 | 12/2015 | Leung et al. | |
| 2002/0060947 A1 | 5/2002 | Hatae | |
| 2002/0131596 A1* | 9/2002 | Boeckeler | G06K 19/073 380/252 |
| 2003/0107501 A1 | 6/2003 | Lim | |
| 2003/0197529 A1 | 10/2003 | Campbell | |
| 2006/0082388 A1* | 4/2006 | Bjorksten | H03K 19/0963 326/95 |
| 2007/0241732 A1 | 10/2007 | Luo et al. | |
| 2011/0285420 A1 | 11/2011 | Deas et al. | |
| 2012/0016650 A1 | 1/2012 | Hollis | |
| 2012/0200313 A1 | 8/2012 | Kyue et al. | |
| 2013/0124591 A1 | 5/2013 | Buch et al. | |
| 2014/0259161 A1 | 9/2014 | Kastner et al. | |
| 2016/0126842 A1 | 5/2016 | Oki et al. | |
| 2016/0181805 A1 | 6/2016 | Lin et al. | |
| 2016/0261205 A1 | 9/2016 | Kolar et al. | |
| 2018/0032655 A1 | 2/2018 | Levi et al. | |
| 2019/0157983 A1 | 5/2019 | Lee et al. | |
| 2019/0220554 A1 | 7/2019 | Levi et al. | |
| 2020/0082031 A1 | 3/2020 | Levi et al. | |

FOREIGN PATENT DOCUMENTS

| | | |
|---|---|---|
| EP | 1926241 | 5/2008 |
| WO | WO 2018/002934 | 1/2018 |
| WO | WO 2018/002939 | 1/2018 |
| WO | WO 2019/167050 | 9/2019 |

OTHER PUBLICATIONS

International Preliminary Report on Patentability dated Jan. 10, 2018 From the International Bureau of WIPO Re. Application No. PCT/IL2017/050727. (5 Pages).

International Preliminary Report on Patentability dated Jan. 10, 2019 From the International Bureau of WIPO Re. Application No. PCT/IL2017/050732. (5 Pages).

International Preliminary Report on Patentability dated Sep. 10, 2020 From the International Bureau of WIPO Re. Application No. PCT/IL2019/050230. (6 Pages).

International Search Report and the Written Opinion dated Oct. 16, 2017 From the International Searching Authority Re. Application No. PCT/IL2017/050727. (11 Pages).

International Search Report and the Written Opinion dated Sep. 25, 2017 From the International Searching Authority Re. Application No. PCT/IL2017/050732. (9 Pages).

International Search Report and the Written Opinion dated May 30, 2019 From the International Searching Authority Re. Application No. PCT/IL2019/050230. (9 Pages).

Notice of Allowance dated Nov. 4, 2019 From the US Patent and Trademark Office Re. U.S. Appl. No. 16/312,317. (5 Pages).

Notice Of Allowance dated Aug. 15, 2019 From the US Patent and Trademark Office Re. U.S. Appl. No. 15/636,902. (5 pages).

Official Action dated Jul. 10, 2019 From the US Patent and Trademark Office Re. U.S. Appl. No. 13/312,317. (40 Pages).

Official Action dated Feb. 27, 2019 From the US Patent and Trademark Office Re. U.S. Appl. No. 15/636,902. (34 pages).

Official Action dated Apr. 8, 2020 from the US Patent and Trademark Office Re. U.S. Appl. No. 16/313,901. (26 pages).

Alioto et al. "A General Power Model of Differential Power Analysis Attacks to Static Logic Circuits", IEEE Transactions on Very Large Scale Integration (VLSI) Systems, 18(5): 711-724, Published Online Apr. 23, 2010.

Alioto et al. "Effectiveness of Leakage Power Analysis Attacks on DPA-Resistant Logic Styles Under Process Variations", IEEE Transactions on Circuits and Systems I: Regular Papers, 61(2): 429-442, Published Online Jan. 24, 2014.

Alioto et al. "Leakage Power Analysis Attacks Against A Bit Slice Implementation of the Serpent Block Cipher", 2014 Proceedings of the 21st International Conference on Mixed Design of Integrated Circuits and Systems, MIXDES 2014, Lublin, Poland, Jun. 19-21, 2014, p. 241-246, Jun. 19, 2014.

Alioto et al. "Leakage Power Analysis Attacks: A Novel Class of Attacks to Nanometer Cryptographic Circuits", IEEE Transactions on Circuits I: Regular Papers, 57(2): 355-367, Published Online Feb. 10, 2010.

Alioto et al. "Leakage Power Analysis Attacks: Well-Defined Procedure and First Experimental Results", 2009 International Conference on Microelectronics, ICM, Marrakech, Morocco, Dec. 19-22, 2009, p. 46-49, Dec. 19, 2009.

Arunachalam et al. "False Coupling Interactions in Static Timing Analysis", Proceedings of the 38th Annual Design Automation Conference, DAC 2001, Las Vegas, Nevada, USA, Jun. 18-22, 2001, p. 726-731, Jun. 18, 2001.

Avital et al. "Randomized Multitopology Logic Against Differential Power Analysis", IEEE Transactions on Very Large Scale Integration (VLSI) Systems, 23(4): 702-711, Jun. 4, 2014.

Baddam et al. "Divided Backened Duplication Methodology for Balanced Dual Rail Routing", Proceedings of the 10th International Workshop on Cryptographic Hardware and Embedded Systems, CHES 2008, Washington, DC, USA, Aug. 10-13, 2008, p. 396-410, Aug. 10, 2008.

Balasch et al. "On the Cost of Lazy Engineering for Masked Software Implementations", 13th International Conference on Smart Card Research and Advanced Applications, CARDIS 2014, Paris, France, Nov. 5-7, 2014, LNCS 8968: 64-81, Nov. 5, 2014.

Batina et al. "Public-Key Cryptography for RFID-Tags", 5th Annual IEEE International Conference on Pervasive Computing and Communications Workshop, PerComW'07, White Plains, NY, USA, Mar. 19-23, 2007, p. 217-222, Mar. 19, 2007.

Becker et al. "Test Vector Leakage Assessment (TVLA) Methodology in Practice", International Cryptographic Module Conference, 1001: 1-13, 2013.

Bilgin et al. "A More Efficient AES Threshold Implementation", Proceedings of the 7th International Conference on Cryptology in Africa, AFRICACRYPT 2014, Marrakesh, Morocco, May 28-30, 2014, 8469: 267-284, May 28, 2014.

Bilgin et al. "Higher Order Threshold Implementations", International Conference on the Theory and Application of Cryptology and Information Security, Advances in Cryptology, ASIACRYPT 2014, p. 326-43, Dec. 7, 2014.

Brier et al. "Correlation Power Analysis With A Leakage Model", International Workshop on Cryptographic Hardware and Embedded Systems—CHES 2004, p. 16-29, Aug. 11, 2004.

Bucci et al. "A Countermeasure Against Differential Power Analysis Based on Random Delay Insertion", IEEE International Symposium (56) References Cited

OTHER PUBLICATIONS on Circuits and Systems, ISCAS 2005, Kobe, Japan, May 23-26, 2005, 4: 3547-3550, May 23, 2005.
Bucci et al. "A Flip-Flop for the DPA Resistant Three-Phase Dual-Rail Pre-Charge Logic Family", IEEE Transactions on Very Large Scale Integration (VLSI) Systems, 20(11): 2128-2132, Published Online Oct. 6, 2011.
Bucci et al. "Delay-Based Dual-Rail Precharge Logic", IEEE Transactions on Very Large Scale Integration (VLSI) Systems, 19(7): 1147-1153, Published Online Jun. 24, 2011.
Bucci et al. "Three-Phase Dual-Rail Pre-Charge Logic", Proceedings of the 8th International Conference on Cryptographic Hardware and Embedded Systems, CHES 2006, Yokohama, Japan, Oct. 10-13, 2006, p. 232-234, Oct. 10, 2006.
Cao et al. "Mapping Statistical Process Variations Toward Circuit Performances Variability: An Analytical Modeling Approach", IEEE Transactions on Computer-aided Design of Integrated Circuits and Systems, 26(10): 1866-1873, Oct. 2007.
Cevrero et al. "Power-Gated MOS Current Mode Logic (PG-MCML): A Power Aware DPA-Resistant Standard Cell Library", Proceedings of the 48th ACM/EDAC/IEEE Design Automation Conference, DAC 2011, San Diego, CA, USA, Jun. 5-10, 2011, Chap.53.6: 1014-1019, Jun. 5, 2011.
Chabaud et al. "Links Between Differential and Linear Cryptoanalysis", Workshop on the Theory and Application of Cryptographic Techniques, Advances in Cryptology, EUROCRYP'94, 950(LASEC-CONF-1995-001): 356-365, Published Online May 9, 1994.
Chapiro "Globally-Asynchronous Locally-Synchronous Systems", A Dissertation Submitted to the Department of Computer Science and the Committee on Graduate Studies of Stanford University in Partial Fulfillment of the Requirements for the Degree of Doctor of Philosophy, Stanford University, Stanford, CA, USA, p. 1-123, Oct. 1984.
Chen et al. "Power Supply Noise Analysis Methodology for Deep-Submicron VLSI Chip Design", Proceedings of the 34th Annual Design Automation Conference, DAC'97, Anaheim, CA, USA, Jun. 9-13, 1997, 40.3: 638-643, Jun. 9, 1997.
Clavier et al. "Differential Power Analysis in the Presence of Hardware Countermeasures", Proceedings of the 2nd International Workshop on Cryptographic Hardware and Embedded Systems, CHES 2000, Worcester, MA, USA, Aug. 17-18, 2000, p. 252-263, Aug. 17, 2000.
Daemen "The Design of Rijndael: AES—The Advanced Encryption Standard", Springer Science & Business Media, p. 1-238, Nov. 26, 2001.
Das et al. "High Efficiency Power Side-Channel Attack Immunity Using Noise Injection in Attenuated Signature Domain", 2017 IEEE International Symposium on Hardware Oriented Security and Trust, HOST, McLean, VA, USA, May 1-5, 2017, p. 62-67, May 1, 2017.
De Mulder et al. "Practical DPA Attacks on MDPL", First IEEE International Workshop on Information Forensics and Security, WIFS 2009, London, UK, Dec. 6-9, 2009, p. 191-195, Dec. 6, 2009.
Del Pozo et al. "Side-Channel Attacks From Static Power: When Should We Care?", Proceedings of the 2015 Design, Automation & Test in Europe Conference & Exhibition, DATE'15, Grenoble, France, Mar. 9-13, 2015, p. 145-150, Mar. 9, 2015.
Du et al. "Multi-Core Architecture With Asynchronous Clocks to Prevent Power Analysis Attacks", IEICE Electronics Express, 14(4):20161220-1-20161220-10, Published Online Feb. 9, 2017. Abstract, Sections 1, 2.
Evans "Embedded Incomplete Latin Squares", The American Mathematical Monthly, 67(10): 958-961, Dec. 1960.
Gao et al. "Analog Circuit Shielding Routing Algorithm Based on Net Classification", Proceedings of the 16th ACM/IEEE International Symposium on Low Power Electronics and Design, ISPLED'10, Austin, Texas, USA, Aug. 18-20, 2010, p. 123-128, Aug. 18, 2010.
Gierlichs et al. "Revisiting Higher-Order DPA Attacks: Multivariate Mutual Information Analysis", Proceedings of the 2010 International Conference on Topics in Cryptology, CT-RSA 2010, San Francisco, CA, USA, Mar. 1-5, 2010, p. 221-234, Mar. 1, 2010.
Gierlichs et al. "Statistical and Information—Theoretic Methods for Power Analysis on Embedded Cryptography", Dissertation Presented in Partial Fulfillment of the Requirements for the Degree of Doctor in Engineering, Katholieke Universiteit Leuven, Gelgium, Arenberg Doctoral School of Science, Engineering & Technology, Faculty of Engineering, Department of Electrical Engineering, ESAT, p. 1-161, Jan. 2011.
Goodwill et al. "A Testing Methodology for Side-Channel Resistance Validation", NIST Non-Invasive Attack Testing Workshop, p. 1-15, 2011.
Gornik et al. "A Hardware-Based Countermeasure to Reduce Side-Channel Leakage: Design, Implementation, and Evaluation", IEEE Transactions on Computer-Aided Design on Integrated Circuits and Systems, 34(8): 1308-1319, Published Online Apr. 16, 2015.
Güneysu et al. "Generic Side-Channel Countermeasures for Reconfigurable Devices", Proceedings of the 13th International Workshop on Cryptographic Hardware and Embedded Systems, CHES'11, Nara, Japan, Sep. 18-Oct. 1, 2011, p. 33-48, Sep. 28, 2011.
Gürkaynak et al. "Improving DPA Security by Using Globally-Asynchronous Locally-Synchronous Systems", Proceedings of the 31st European Solid-State Circuits Conference, ESSCIRC 2005, Grenoble, France, Sep. 12-16, 2005, p. 407-410, Sep. 12, 2005.
Heydari et al. "Capacitive Coupling Noise in High-Speed VLSI Circuits", IEEE Transactions on Computer-Aided Design of Integrated Circuits and Systems, 24(3): 478-488, Mar. 2005.
Huffman "The Design and Use of Hazard-Free Switching Networks", Journal of the ACM, JACM, 4(1): 47-62, Jan. 1957.
Hwang et al. "AES-Based Security Coprocessor IC in 0.18-?m CMOS With Resistance to Differential Power Analysis Side-Channel Attacks", IEEE Journal of Solid-state Circuits, 41(4): 781-792, Apr. 2006.
Joye et al. "On Second-Order Differential Power Analysis", Proceedings of the 7th International Conference on Cryptographic Hardware and Embedded Systems, CHES 2005, Edinburgh, UK, Aug. 29-Sep. 1, 2005, LNCS 3659: 293-308, Aug. 29, 2005.
Kamoun et al. "Experimental Implementation of 2ODPA Attacks on AES Design With Flash-Based FPGA Technology", 22nd IEEE International Conference on Microelectronics, IMC 2010, Cairo, Egypt, Dec. 19, 2010, p. 407-410, Dec. 19, 2010.
Kocher et al. "Differential Power Analysis", Proceedings of the 19th Annual International Cryptology Conference on Advances in Cryptology, CRYPTO'99, Aug. 15-19, 1999, p. 388-397, Aug. 15, 1999.
Kocher et al. "Introduction to Differential Power Analysis", Journal of Cryptographic Engineering, 1(1): 5-27, Published Online Mar. 3, 2011.
Krstic et al. "System Integration by Request-Driven GALS Design", IEE Proceedings—Computers and Digital Techniques. 153(5): 362-372, Sep. 2006.
Levi et al. "Data-Dependent Delays as A Barrier Against Power Attacks", IEEE Transactions on Circuits and Systems I: Regular Papers, 62(8): 2069-2078, Published Online Jul. 24, 2015. Sections I, II.
Loder et al. "Towards A Framework to Perform DPA Attack on GALS Pipeline Architectures", Proceedings of the 27th Symposium on Integrated Circuits and Systems Design, SBCCI'14, Aracaju, Brazil, Sep. 1-5, 2014, Art.33: 1-7, Sep. 1, 2014.
Mace et al. "A Dynamic Current Mode Logic to Counteract Power Analysis Attacks", Proceedings of the 19th International Conference on Design of Circuits and Integrated Systems, DCIS 2004, Bordeaux, France, p. 186-191, Nov. 24, 2004.
Mangard et al. "Hardware Countermeasures Against DPA—A Statistical Analysis of Their Effectiveness", Topics in Cryptology—CT-RSA 2004, Proceedings of The Cryptographers' Track at the RSA Conference 2004, San Francisco, CA, USA, Feb. 2004, LNCS 2964: 222-235, Feb. 2004.
Mangard et al. "One for All—All for One: Unifying Standard DPA Attacks", IET Information Security, 5(2): 100-111, 2011.
Mangard et al. "Side-Channel Leakage of Masked CMOS Gates", Proceedings of the 2005 International Conference on Topics in Cryptology—CT-RSA 2005, San Francisco, CA, USA, Feb. 14-18, 2005, 3376: 351-365, Feb. 14, 2005.
Mangard et al. "Successfully Attacking Masked AES Hardware Implementations", Proceedings of the 7th International Conference (56) References Cited

OTHER PUBLICATIONS on Cryptographic Hardware and Embedded Systems, CHES 2005, Edinburgh, UK, Aug. 29-Sep. 1, 2005, p. 157-171, Aug. 29, 2005.
Mayhew "Design of An On-Chip Power Analysis Attack Countermeasure Incorporating A Randomized Switch Box", A Thesis Presented in Partial Fulfilment of Requirements for the Degree of Doctor of Philosophy in Engineering, University of Guelph, Ontario, Canada, p. 1-242, Apr. 2016.
Messerges "Using Second-Order Power Analysis to Attack DPA Resistant Software", Proceedings of the 2nd International Workshop on Cryptographic Hardware and Embedded Systems, CHES 2000, Worcester, MA, USA, Aug. 17-18, 2000, LNCS 1965: 238-251, Aug. 17, 2000.
Messerges et al. "Examining Smart-Card Security Under the Threat of Power Analysis Attacks", IEEE Transactions on Computers, 51(5): 541-552, May 2002.
Moore et al. "Balanced Self-Checking Asynchronous Logic for Smart Card Applications", Microprocessors and Microsystems, 27(9): 421-430, Oct. 31, 2003.
Moradi et al. "Information Leakage of Flip-Flops in DPA-Resistant Logic Styles", IACR Cryptology ePrint Archive, 2008: 188-1-188-13, 2008.
Moradi et al. "Pushing the Limits: A Very Compact and A Threshold Implementation of AES", Annual International Conference on the Theory and Applications of Cryotpgraphic Techniques, LNCS, 6632: 69-88, May 2011.
Muttersbach et al. "Practical Design of Globally-Asynchronous Locally-Synchronous Systems", Proceedings of the 6th International Symposium on Advanced Research in Asynchronous Circuits and Systems, ASYNC 2000, Eilat, Israel, Apr. 2-6, 2000, p. 52-59, Apr. 2, 2000.
Naccache et al. "Cryptographic Smart Cards", IEEE Micro, 16(3): 14, 16-24, Jun. 1996.
Oswald et al. "Practical Second-Order DPA Attacks for Masked Smart Card Implementations of Block Ciphers", Proceedings of the 2006 The Cryptographers' Track at the RSA Conference on Topics in Cryptology, CT-RSA 2006, San Jose, CA, USA, Feb. 13-17, 2006, p. 192-207, Feb. 13, 2006.
Peeters et al. "Improved Higher-Order Side-Channel Attacks With FPGA Experiments", Proceedings of the 7th International Conference on Cryptographic Hardware and Embedded System, CHES 2005, Edinburgh, UK, Aug. 29-Sep. 1, 2005, p. 309-323, Aug. 29, 2005.
Popp et al. "Evaluation of the Masked Logic Style MDPL on A Prototype Chip", Proceedings of the 9th International Workshop on Cryptographic Hardware and Embedded Systems, CHES'07, Vienna, Austria, Sep. 10-13, 2007, p. 81-94, Sep. 10, 2007.
Popp et al. "Implementation Aspects of the DPA-Resistant Logic Style MDPL", Proceedings of the 2006 IEEE International Symposium on Circuits and Systems, ISCAS 2006, Island of Kos, Greece, May 21-24, 2006, p. 2913-2916, May 21, 2006.
Ratanpal et al. "An On-Chip Signal Suppression Countermeasure to Power Analysis Attacks", IEEE Transactions on Dependable and Secure Computer, 1(3): 179-189, Jul.-Sep. 2004.
Saha "Modeling Process Variability in Scaled CMOS Technology", IEEE Design & Test of Computers, 27(2): 8-16, Mar. 18, 2010.
Schramm et al. "Higher Order Masking of the AES", Proceedings of the 2006 The Cryptographers' Track at the RSA Conference on Topics in Cryptology, CT-RSA 2006, San Jose, CA, USA, Feb. 13-17, 2006, p. 208-225, Feb. 13, 2006.
Shamir "Protecting Smart Cards From Passive Power Analysis With Detached Power Supplies", Proceedings of the Second International Workshop on Cryptographic Hardware and Embedded Systems, CHES '00, Worcester, MA, USA, Aug. 17-18, 2000, LNCS 1965: 71-77, Aug. 17, 2000.
Shang et al. "High-Security Asynchronous Circuit Implementation of AES", IEE Proceedings—Computers and Digital Techniques, 153(2): 71-77, Mar. 6, 2006.
Sharma et al. "Signal Integrity and Propagation Delay Analysis Using FDTD Technique for VLSI Interconnects", Journal of Computational Electronics, 13(1): 300-306, Published Online Nov. 9, 2013.
Sokolov et al. "Design and Analysis of Dual-Rail Circuits for Security Applications", IEEE Transactions on Computers, 54(4): 449-460, Published Online Feb. 15, 2005.
Sokolov et al. "Improving the Security of Dual-Rail Circuits (Revision 2)", School of Electrical, Electronic & Computer Engineering, University of Newcastle Upon Tyne, UK, Technical Report Series, NCL-EECE-MSD-TR-2004-101-Rev.2, p. 1-22, Jan. 2004.
Standaert et al. "A Unified Framework for the Analysis of Side-Channel Key Recovery Attacks", Proceedings of the 28th Annual International Conference on the Theory and applications of Cryptographic Techniques—Advances in Cryptology, EUROCRYPT 2009. Cologne, Germany, Apr. 26-30, 2009, LNCS 5459: 443-461, Apr. 26, 2009.
Stojanovic et al. "Comparative Analysis of Master-Slave Latches and Flip-Flops for High-Performance and Low-Power Systems", IEEE Journal of Solid-State Circuits, 34(4): 536-548, Apr. 1999.
Suzuki et al. "Security Evaluation of DPA Countermeasures Using Dual-Rail Pre-Charge Logic Style", Proceedings of the 8th International Conference on Cryptographic Hardware and Embedded Systems, CHES 2006, Yokohama, Japan, Oct. 10-13, 2006, p. 255-269, Oct. 10, 2006.
Tiri et al. "A Logic Level Design Methodology for A Secure DPA Resistant ASIC or FPGA Implementation", Proceedings of the Conference on Design, Automation and Test in Europe, DATE'04, Paris, France, Feb. 16-20, 2004, 1: 10246-1-10246-6, Feb. 16, 2004.
Tiri et al. "Charge Recycling Sense Amplifier Based Logic: Securing Low Power Security IC's Against DPA", Proceedings of the 30th European Solid-State Circuits Conference, ESSCIRC'04, Leuwen, Belgium, Sep. 23, 2004, p. 179-182, Sep. 23, 2004.
Tokunaga et al. "Securing Encryption Systems With A Switched Capacitor Current Equalizer", IEEE Journal of Solid-State Circuits, 45(1): 23-31, Published Online Dec. 23, 2009.
Triantis et al. "Thermal Noise Modeling for Short-Channel MOSFET's", IEEE Transactions on Electron Devices, 43(11): 1950-1955, Nov. 1996.
Vaquie et al. "Secure D Flip-Flop Against Side Channel Attacks", IET Circuits, Devices & Systems, 6(5): 347-354, Sep. 2012.
Waddle etal. "Towards Efficient Second-Order Power Analysis", International Workshop on Cryptographic Hardware and Embedded Systems, CHES 2004, Cambridge, MA, USA, Aug. 11-13, 2004, 6(3156): 1-15, Aug. 11, 2004.
Wang et al. "Role of Power Grid in Side Channel Attack and Power-Grid-Aware Secure Design", Proceedings of the 50th Annual Design Automation Conference, DAC'13, Austin, TX, USA, May 29-Jun. 7, 2013, Art.78: 1-9, May 29, 2013.
Welch "The Generalization of Student's' Problem When Several Different Population Variances Are Involved", Biometrika, 34(1/2): 28-35, Jan. 1947.
Wu et al. "Measurement and Evaluation of Power Analysis Attacks on Asynchronous S-Box", IEEE Transactions on Instrumentation and Measurement. 61(10): 2765-2775, Published Online Jun. 11, 2012.
Xu et al. "Timing Uncertainty in 3-D Clock Trees Due to Process Variations and Power Supply Noise", IEEE Transactions on Very Large Scale Integration (VLSI) Systems, 21(12): 2226-2239, Published Online Jan. 11, 2013.
Yang et al. "Power Attack Resistant Cryptosystem Design: A Dynamic Voltage and Frequency Switching Approach", Proceedings of the Design, Automation and Test in Europe Conference and Exhibition, DATE'05, Munich, Germany, Mar. 7-11, 2005, 3: 64-69, Mar. 7, 2005.

* cited by examiner

INFORMATION REDISTRIBUTION TO REDUCE SIDE CHANNEL LEAKAGE

RELATED APPLICATIONS

This application is a Continuation of PCT Patent Application No. PCT/IL2019/050230 having International filing date of Feb. 28, 2019, which claims the benefit of priority under 35 USC § 119(e) of U.S. Provisional Patent Application No. 62/636,238 filed on Feb. 28, 2018. The contents of the above applications are all incorporated by reference as if fully set forth herein in their entirety.

FIELD AND BACKGROUND OF THE INVENTION

The present invention, in some embodiments thereof, relates to a countermeasure against side-channel attacks and, more particularly, but not exclusively, to a logic circuit implementing a countermeasure to side-channel attacks.

Differential power analysis (DPA) attacks exploit the correlation between internal device operations and power consumption. Counteracting DPA attacks has become an essential part of any cryptographic device which may be subjected to adversarial attacks.

Many schemes at different levels of abstraction have been proposed to counteract DPA attacks by reducing the data dependency of the power consumption signature. These countermeasures include hiding, masking, introducing noise and randomizing consumed current profile.

Shamir et. al. [1] proposed to counteract at the power delivery network (PDN) level by using supply decoupling capacitance to attenuate side channel traces.

Other power-delivery based countermeasures include injection of current noise [2] and switched-capacitor based current equalization [3]. Another class of solutions is based on the incorporation of current equalizer circuits at a high abstraction level (e.g. system level). Current equalization can be achieved through several approaches such as:
  A. A switched-capacitor based current equalization [3]. The encryption module is connected to local capacitors with charging phase in each cycle, ensuring equalized charging current.
  B. A shunt current equalizer [6] uses a series device in the power path to sense the supply current and equalizes it by generating parallel current path.
  C. Supply current attenuator [7] and additional noise injection to reduce SNR of the measured signal.

Relative to lower abstraction level countermeasures, the PDN countermeasures require smaller area and power overheads, and also entail a lower design effort. The drawback of most PDN countermeasures is that they are relatively easy to tamper with and neutralize unless they are distributed and local for any block.

Additional background art includes:
[1] Shamir, "Protecting smart cards from passive power analysis with detached power supplies," in Cryptographic Hardware and Embedded Systems CHES 2000: Second International Workshop Worcester, Mass., USA, August 1718, 2000 Proceedings, K. Ko and C. Paar, Eds. Berlin, Heidelberg: Springer Berlin Heidelberg, 2000, pp. 71-77, ISBN: 978-3-540-44499-2.
[2] Wang, Xinmu, et al. "Role of power grid in side channel attack and power-grid-aware secure design." Proceedings of the 50th Annual Design Automation Conference. ACM, 2013.
[3] Tokunaga and D. Blaauw, "Securing encryption systems with a switched capacitor current equalizer," IEEE Journal of Solid-State Circuits, vol. 45, no. 1, pp. 23-31, 2010.
[4] T. Gneysu and A. Moradi, "Generic side-channel countermeasures for reconfigurable devices," in Cryptographic Hardware and Embedded Systems CHES 2011: 13th International Workshop, Nara, Japan, Sep. 28 Oct. 1, 2011. Proceedings, B. Preneel and T. Takagi, Eds. Berlin, Heidelberg: Springer Berlin Heidelberg, 2011, pp. 33-48, ISBN: 978-3-642-23951-9.
[5] W. Xinmu, Y. Wen, D. B. Roy, S. Narasimhan, Z. Yu, S. Mukhopadhyay, D. Mukhopadhyay, and S. Bhunia, "Role of power grid in side channel attack and power-gridaware secure design," in 2013 50th ACM/EDAC/IEEE Design Automation Conference (DAC), pp. 1-9, ISBN: 0738-100X.
[6] G. B. Ratanpal, R. D. Williams, and T. N. Blalock, "An on-chip signal suppression countermeasure to power analysis attacks," IEEE Transactions on Dependable and Secure Computing, vol. 1, no. 3, pp. 179-189, 2004.
[7] D. Das, S. Maity, S. B. Nasir, S. Ghosh, A. Raychowdhury, and S. Sen, "High efficiency power side-channel attack immunity using noise injection in attenuated signature domain," arXiv preprint arXiv:1703.10328, 2017.

SUMMARY OF THE INVENTION

According to a first aspect of some embodiments of the present invention there is provided a logic circuit which includes a data signal input, a computational module, a direct timing modulator and an amplitude and non-direct timing modulator. The data signal input inputs data signals. The computational module includes multiple logic elements interconnected to perform a logic function. The direct timing modulator modulates a propagation time of the input data signals from the data signal input to the computational unit, in accordance with a first set of control signals. The amplitude and non-direct timing modulator modulates the processing time of data signals by the computational module and the amplitude of data signals propagating through the computational module, in accordance with a second set of control signals. According to some embodiments of the invention, the first and second sets of control signals are disjoint.

According to some embodiments of the invention, the first and second sets of control signals are non-disjoint.

According to some embodiments of the invention, at least one of the control signals is a data-dependent signal derived from at least one data signal in the logic circuit. According to further embodiments of the invention, a data-dependent signal is one of:
  i) an input data signal;
  ii) a function of at least one input data signal;
  iii) a signal at an internal node of the computational module; and
  iv) a function of at least one signal at an internal node of the computational module.

According to some embodiments of the invention, at least one of the control signals is a random signal.

According to some embodiments of the invention, the logic circuit further includes an internal random generator adapted to generate the random signal.

According to some embodiments of the invention, the random signal is input from an external random signal generator.

According to some embodiments of the invention, the logic elements include at least one of:

i) a CMOS logic element;
ii) a CMOS-based logic element;
iii) a wave dynamic differential logic (WDDL) logic element;
iv) a pass transistor logic (PTL) logic element;
v) biological computation logic element; and
vi) logic for quantum computation systems.

According to a second aspect of some embodiments of the present invention there is provided a logic circuit which includes a voltage regulator, a control signal generator, a delay module and computational module, which operate together so as to modulate at least one of: a propagation delay of the input data signals to the computational module, a duration of the logic operation and an amplitude of the data signals propagating through the computational module. The voltage regulator generates a plurality of regulated supply voltages from at least one input supply voltage by controlling respective levels of the regulated supply voltages in accordance with varying control signals. The control signal generator generates the control signals from at least one of: a data-dependent signal derived from at least one data signal in the logic circuit and a random signal. The delay module is powered by a first regulated supply voltage. The delay module delays input data signals, wherein the magnitude of the delay is dependent on the first regulated supply voltage. The computational module is powered by a second regulated supply voltage, and includes logic elements interconnected to perform a logic function on the delayed data signals.

According to some embodiments of the invention, the at least one input supply voltage includes: an upper supply voltage, a lower supply voltage, and ground.

According to some embodiments of the invention, the voltage regulator generates the first and second regulated supply voltages independently.

According to some embodiments of the invention, the voltage regulator generates the first and second regulated supply voltages independently using different control signals.

According to some embodiments of the invention, the data-dependent signal is one of:
i) an input data signal;
ii) a function of at least one input data signal;
iii) a signal at an internal node of the computational module; and
iv) a function of at least one signal at an internal node of the computational module.

According to some embodiments of the invention, the random signal is one of: random data and a function of random data.

According to some embodiments of the invention, the logic circuit further includes an internal random generator adapted to generate the random signal.

According to some embodiments of the invention, the random signal is input from an external random signal generator.

According to some embodiments of the invention, the control signal generator enables and disables the voltage regulator in accordance with an external enable input signal, wherein when the voltage regulator is disabled the delay module and the computational module are powered by the input supply voltage.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a countermeasure against side-channel attacks and, more particularly, but not exclusively, to a logic circuit implementing a countermeasure to side-channel attacks.

Embodiments of the invention presented herein provide an innovative logic circuit with an attenuated information signature. Control signals, z, are used to directly and non-directly affect the timing and amplitude of the data propagation through the logic circuit. This approach counteracts the temporal and amplitude characteristics of the side channel signal generated by a computational module. The embodiments may be applied to any function that might generate information leakage.

The control signals may include analog and/or binary signals.

As used herein the term "information leakage" means any side channel which is correlated with processed secret information.

Technologies suitable for implementing logic circuits as described herein include but are not limited to:
  i) CMOS;
  ii) Non-standard CMOS-based logic families (e.g. wave dynamic differential logic (WDDL), pass transistor logic (PTL));
  iii) Biological computing; and
  iv) Circuits for quantum computation systems.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
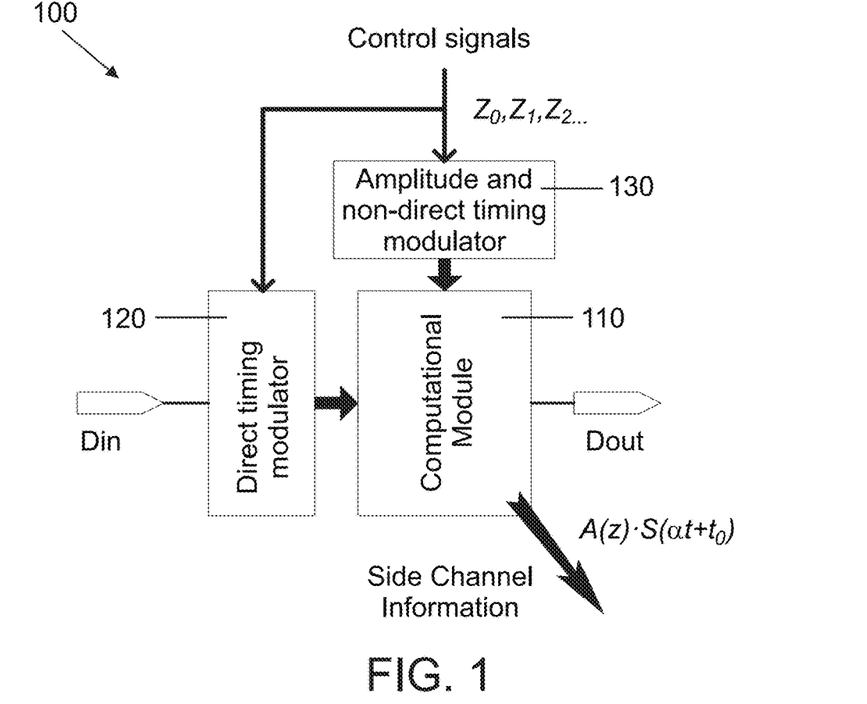
FIG. 1 is a simplified block diagram of a logic circuit with side channel information redistribution, according to embodiments of the invention.

Reference is now made to FIG. 1, which is a simplified block diagram of a logic circuit with side channel information redistribution, according to embodiments of the invention. Logic circuit 100 includes computational module (CM) 110, direct timing modulator 120 and amplitude and non-direct timing modulator 130. CM 110 performs a logic (i.e. computational) operation on data conveyed to it via direct timing modulator 120. Direct timing modulator 120 introduces a propagation delay from the data signal input to computational module 110, in accordance with a first set of control signals. Amplitude and non-direct time modulator 130 affects the amplitude and processing time within CM 110 in accordance with a second set of control signals. The first and second sets of control signals may be disjoint or non-disjoint (i.e. may or may not have some control signals in common).

Figure 2:
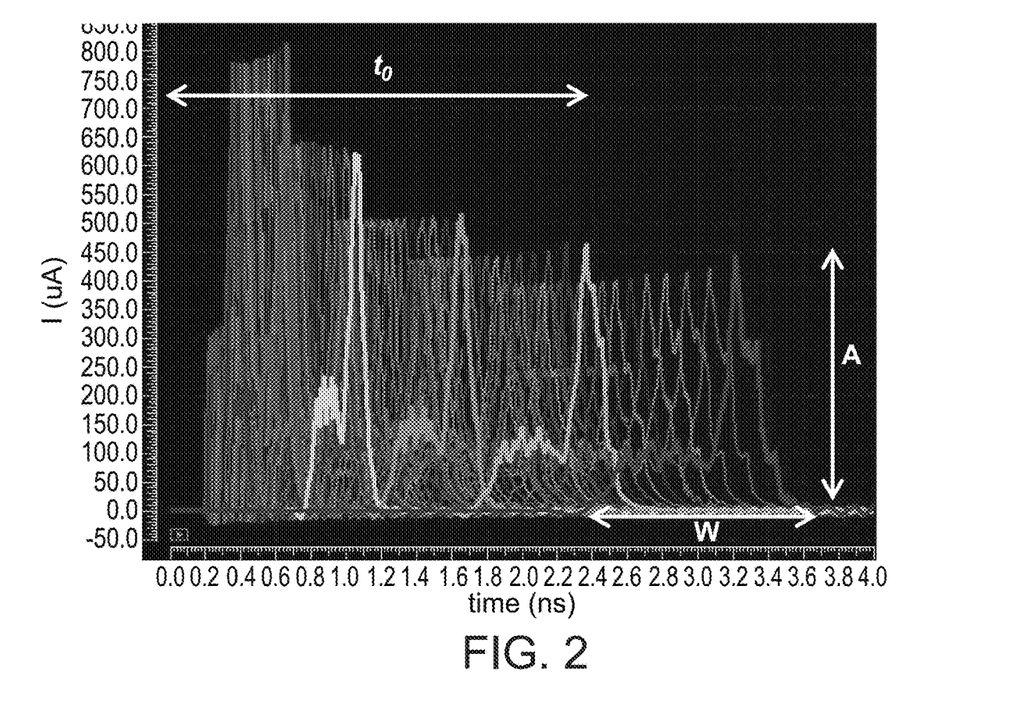
FIG. 2 is an illustration of the clean side channel information and the information manipulation parameters.

Direct timing modulator 120 and amplitude and non-direct timing modulator 130 together manipulate at least three characteristics of the side channel power trace (as illustrated in FIG. 2). These three characteristics are:
  i) $t_0$—the delay of the power signature,
  ii) A—the amplitude of the information signature; and
  iii) w—the duration of the operation performed by the computation module.

The manipulation is achieved by connecting direct timing modulator 120, amplitude and non-direct timing modulator 130 and computational module 110 in such a way that each computation that is made through the basic elements of this module is delayed (t0), and it is non-uniformly stretched or squeezed in time in a non-linear manner. The later manipulation changes the duration (w) and therefore results in a varying amplitude (A). Thus changes in the values of control signals, z, influence the levels of t0, A and w.

As used herein the term "direct modulation" means modulations that are made directly on the propagation path of the input data signal before it enters the computational module. For example, the direct modulation may be controlling the bias on a voltage controlled delay line and/or modifying the length of a delay line by adding or subtracting delay elements dynamically.

As used herein the term "non-direct modulations" means modulations that are made on the data while it is processed inside the computational module. Parameters that influence the processing timing by the basic logic constituents of the computational module affect the side channel information profile without any effect on the logic output of the module. An example of such a parameter is the $V_{dd}$, or body bias provided to the computational module, which modifies the propagation time and power consumption of the computational module.

The control signals, z, vary over time and are re-computed for new incoming data. Consequently the side channel power trace may be represented as $A(z) \cdot S(\alpha t + t_0)$, where A represents the manipulation of the amplitude, $t_0$ represents the manipulation of the delay and α represents the non-linear/non-uniform manipulation of the time axis. Thus the side channel power trace, from which the side channel information is extracted, varies over time in a way that is unknown to the attacker. This variation makes it difficult for the attacker to extract useful information from the side channel power trace.

Optionally, at least one of the control signals is a data-dependent signal derived from at least one data signal in the logic circuit. Further optionally the data-dependent signal is one of:
  i) An input data signal;
  ii) A function of at least one input data signal;
  iii) A signal at an internal node of the computational module; and
  iv) A function of at least one signal at an internal node of the computational module.

Optionally, at least one of the control signals is a random signal. Further optionally the logic circuit includes an internal random generator which generates the random signal. Additionally or alternately, the random signal is input from an external random signal generator.

FIG. 2 illustrates the clean side channel information and the manipulation of $t_0$, A and w, which may be achieved by the embodiments presented herein.

Figure 3A:
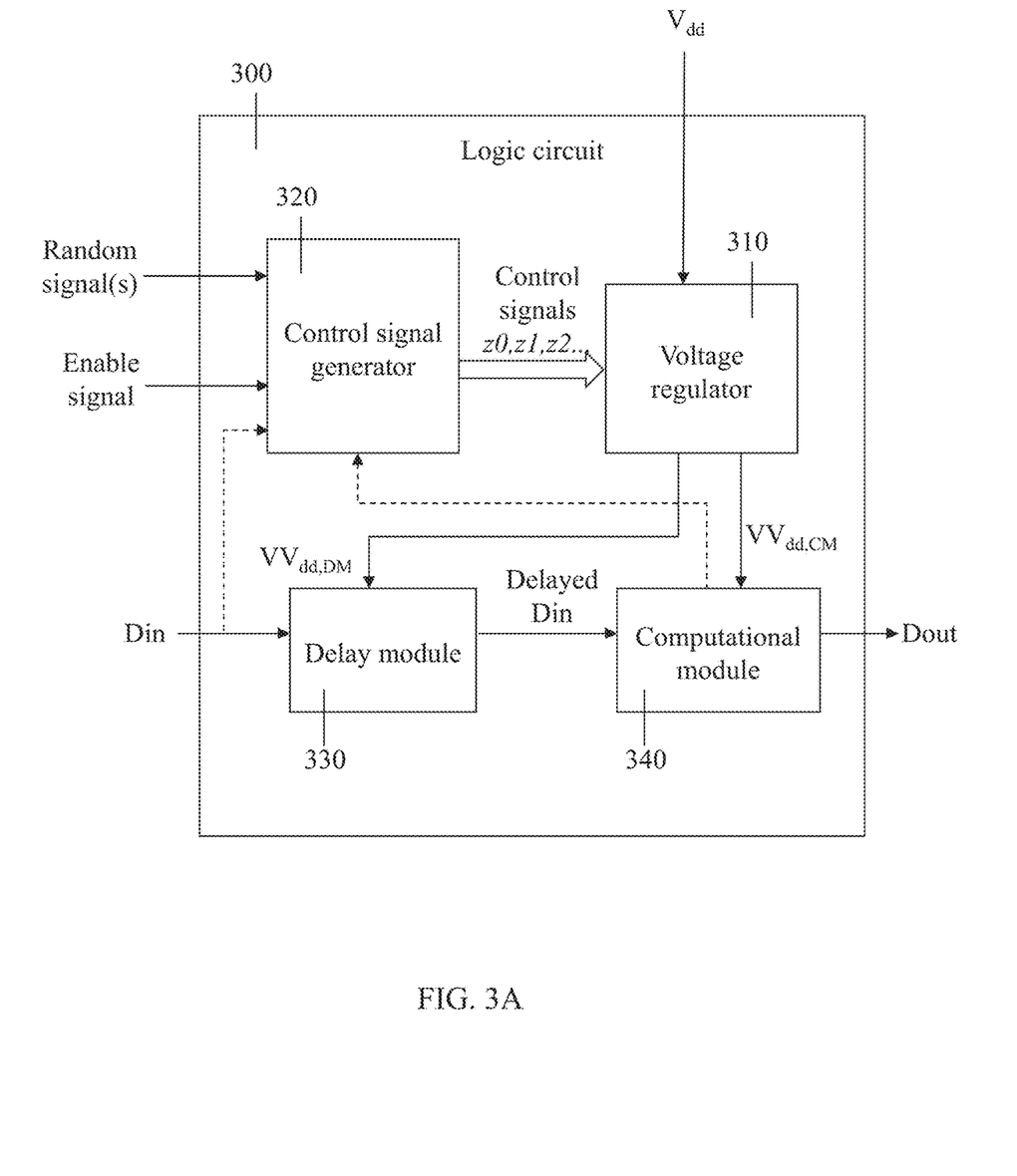
FIGS. 3A and 3B are simplified block diagrams of a logic circuit, according to respective embodiments of the invention.
Figure 3B:
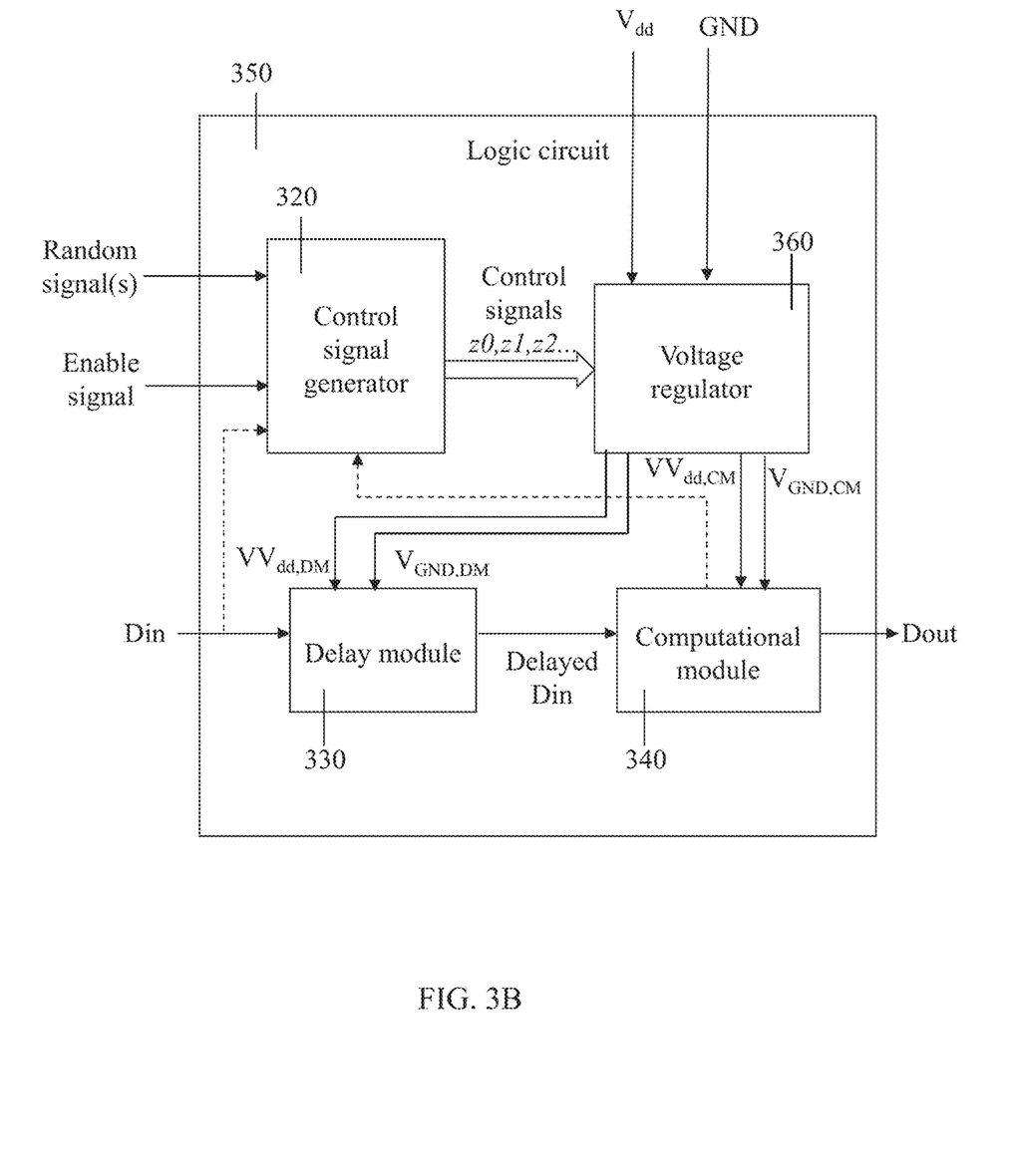

Reference is now made to FIGS. 3A-3B which are simplified block diagrams of a logic circuit, according to respective embodiments of the invention.

In FIG. 3A, logic circuit 300 includes voltage regulator 310, control signal 320, delay module 330 and computational module 340, which together implement directing timing modulation and amplitude and non-direct timing modulation. Logic circuit 300 is thus able to modulate the propagation delay of the input data signals to the computational module ($t0$), a duration of the logic operation (w) and an amplitude of the data signals propagating through the computational module (A).

As used herein the term "modulate" means to change a value of a parameter or characteristic. Optionally:

i) Modulating to means shifting the time the computation process performed by the computation module begins;

ii) Modulating w means stretching or squeezing the duration of the logic operation (typically non-uniformly and/or in a non-linear manner);

iii) Modulating A means changing the amplitude of the data signals.

Voltage regulator 310 generates multiple regulated supply voltages from an input supply voltage, $V_{dd}$, by controlling respective levels of the regulated supply voltages in accordance with control signals, z, that vary over time.

Control signal generator 320 generates the control signals, z, from at least one of: a data-dependent signal derived from at least one data signal in the logic circuit and a random signal.

Delay module 330 is powered by one of the regulated supply voltages, denoted $VV_{dd,DM}$. Delay module 330 delays the arrival of input data signals, Din, at computational module 340. The magnitude of the delay is dependent on $VV_{dd,DM}$. Computational module 340 includes multiple logic elements interconnected to perform a logic function on the delayed data signals.

Computational module 340 is powered by a second regulated supply voltage, denoted $VV_{dd,CM}$, which is generated by voltage regulator 310. The computation begins when the delayed Din signals arrive at computational module 340.

The term $VV_{dd}$ is used to indicate that the respective $V_{dd}$ supply voltages powering delay module 330 and computational module 340 are "virtual" supply voltages, because their amplitude is deliberately manipulated. This is in contrast with a typical input supply voltage $V_{dd}$ whose amplitude is maintained at a steady level.

Optionally, voltage regulator 310 generates $VV_{dd,DM}$ and $VV_{dd,CM}$ independently. Further optionally, voltage regulator 310 generates $VV_{dd,DM}$ and $VV_{dd,CM}$ using different sets of control signals.

Optionally, control signal generator 320 includes an enable signal input for inputting an external enable signal. Control signal generator 320 enables and disables the operation of voltage regulator 310 based on the level of the external enable signal. When voltage regulator 310 is disabled, delay module 330 and computational module 340 are powered by the input supply voltage $V_{dd}$. Disabling the voltage regulator may be used for low power mode circuit operation, since no power is used to generate virtual supply voltages $VV_{dd,DM}$ and $VV_{dd,CM}$.

Optionally, control signal generator 320 generates the control signals, z, from data-dependent signal(s) derived from at least one data signal in the logic circuit and/or from random signal(s).

Optionally control signal generator 320 obtains the data-dependent signal(s) from computational module 340 and/or Din (see dashed lines in FIG. 3A). Further optionally the data-dependent signal is one of:

i) An input data signal;

ii) A function of at least one input data signal;

iii) A signal at an internal node of computational module 340; and iv) A function of at least one signal at an internal node of the computational module.

Optionally logic circuit 300 includes an internal random generator (not shown) which generates one or more random signals. Additionally or alternatively, random signal(s) are input from an external random signal generator.

Optionally random signal(s) and data-dependent signals are combined, and the combined signal(s) thus obtained are used as control signal(s).

FIG. 3B presents an embodiment of logic circuit 350 in which voltage regulator 360 is capable of regulating the upper supply voltage, $V_{dd}$, and/or ground (GND). Voltage regulator 360 provides regulated voltages, $VV_{dd}$ and $V_{GND}$ to delay module 330 and/or computational module 340. Control signal generator 320, delay module 330 and computational module 340 operate substantially as described for FIG. 3A.

Optionally, voltage regulator 360 regulates only some of the supply and/or ground voltage(s) to delay module 330 and/or computational module 340. For example, voltage regulator 360 may regulate the $V_{dd}$ supplied to delay module 330 and the ground supplied to computational module 340.

Figure 5:
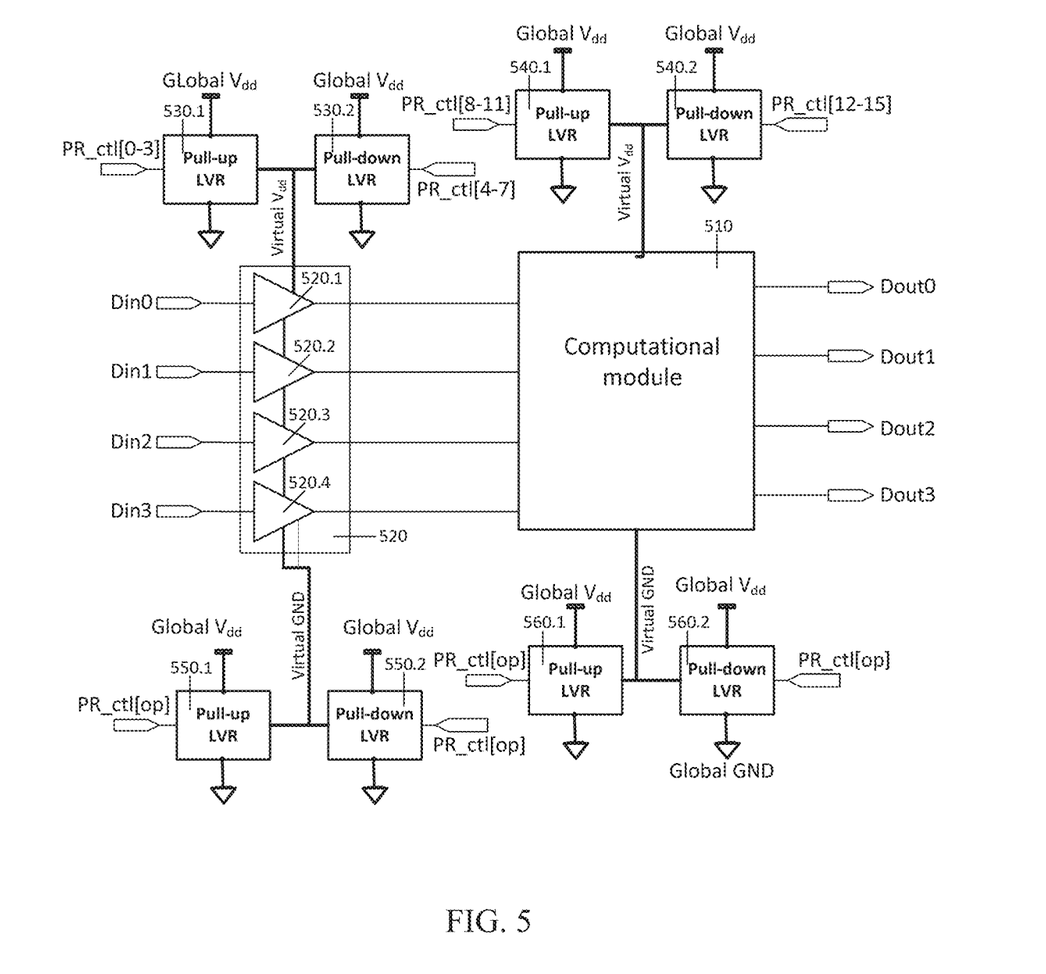

An exemplary embodiment of a logic circuit with regulated $V_{dd}$ and regulated ground (also denoted virtual ground) is illustrated in FIG. 5 and described below.

Figure 4:
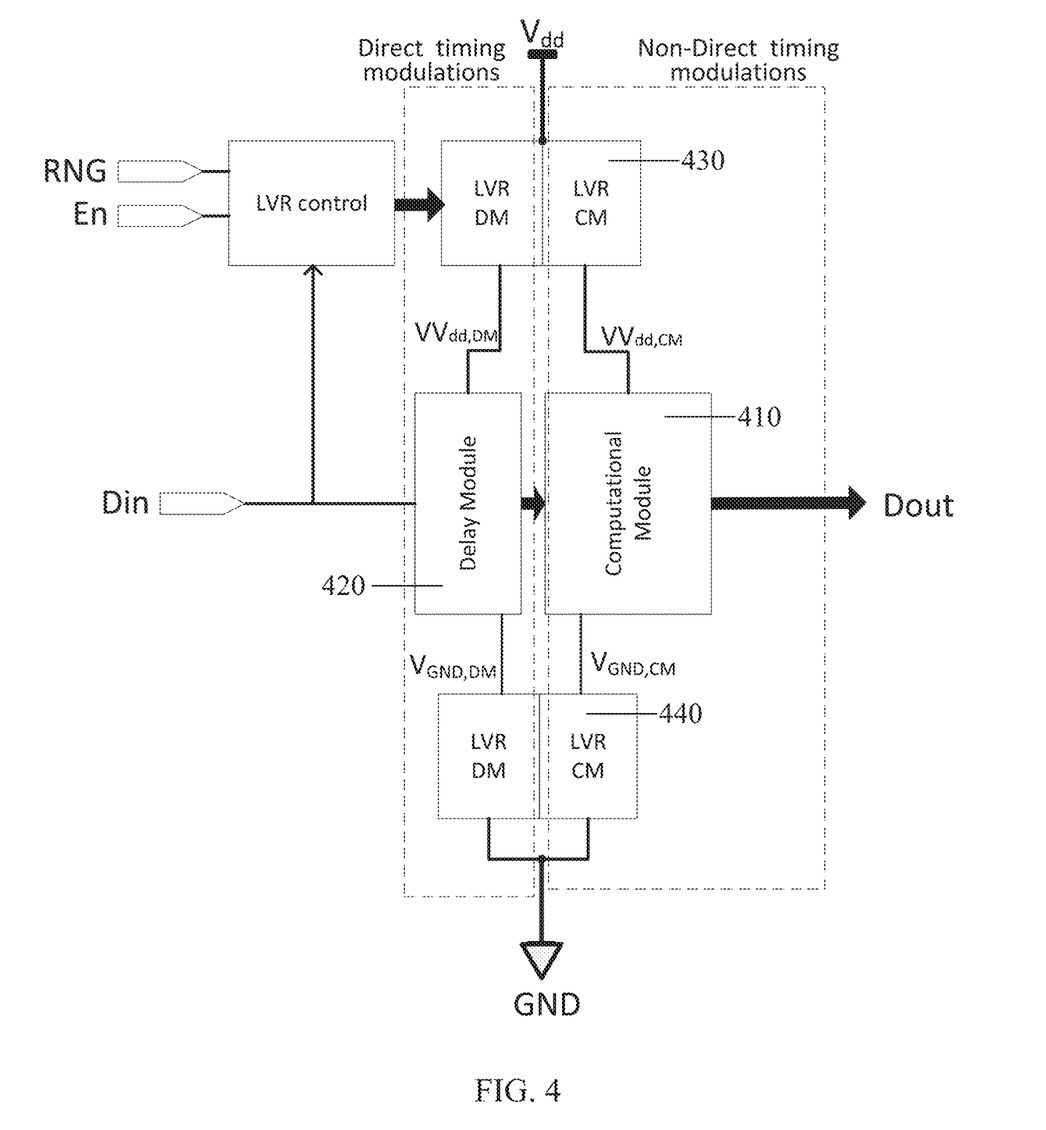
FIGS. 4 and 5 are simplified block diagrams of a logic circuit, according to respective exemplary embodiments of the invention.

Reference is now made to FIG. 4, which is a simplified block diagram of logic circuit, according to exemplary embodiments of the invention. Embodiments of the invention manipulate to, A and w as follows. Computational module 410 is connected to a first supply voltage, denoted the computational module virtual $V_{dd}$ ($VV_{dd,CM}$) and virtual ground ($V_{GND,CM}$). The input data (Din) propagates through delay module 420 that is powered by different supply voltages, denoted the delay module virtual $VV_{dd}$ (i.e. $VV_{dd,DM}$) and virtual ground ($V_{GND,DM}$). The virtual supply rails (namely $VV_{dd,CM}$, $VV_{dd,DM}$ $V_{GND,CM}$ and $V_{GND,DM}$) are generated by integrated local voltage regulators (LVR) 430 and 440, which are optionally located in the vicinity of computational module 410.

Reference is now made to FIG. 5, which is a simplified block diagram of a logic circuit according to exemplary embodiments of the invention. Amplitude and non-direct timing modulation is performed by regulating power supply and/or ground to computation module 510. Direct timing modulation is performed by regulating power supply and/or ground to delay module 520 (which in the non-limiting exemplary embodiment includes four delay elements 520.1-520.4).

Modulation of the supply voltage(s) and/or ground is performed by LVRs connected to computational module 510 (to modulate the amplitude and duration of the computation) and to delay module 520 (to modulate the propagation delay of the data inputs into the computational module). Each LVR provides a virtual supply voltage $VV_{dd}$ or a virtual GND which serves as the power supply or ground rail connected to the delay module or computational module to which it is connected.

Optionally one or more of the LVRs is a pull-up LVR. Alternately or additionally, one or more of the LVRs is a pull-down LVR.

The term "pull-down" indicates that the control signals manipulate a pull-down (nMOS) network. The term "pull-up" indicates that the control signals manipulate a pull-up (pMOS) network.

Figure 6A:
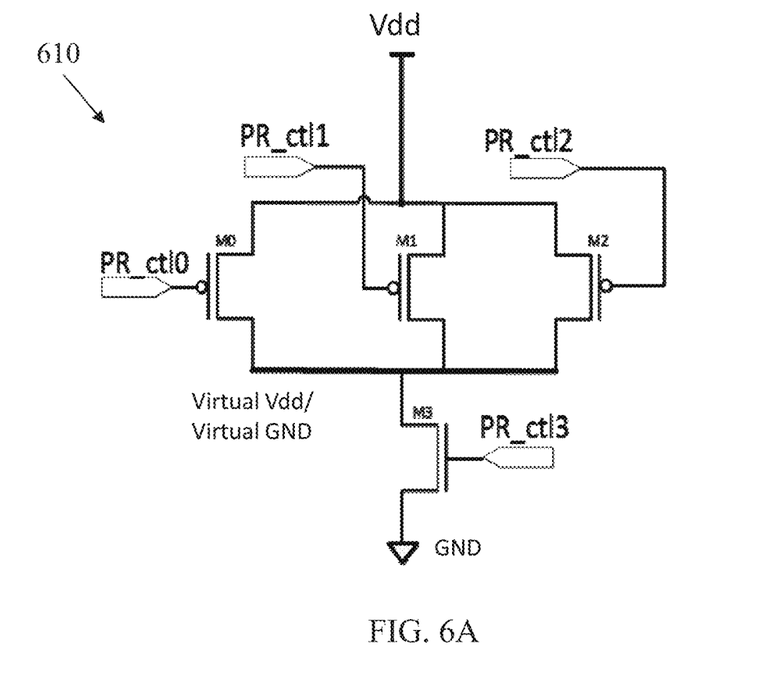
FIGS. 6A and 6B are simplified circuit diagrams of a pull-up integrated local voltage regulator (LVR) and a pull-down LVR respectively, according to exemplary embodiments of the invention.
Figure 6B:
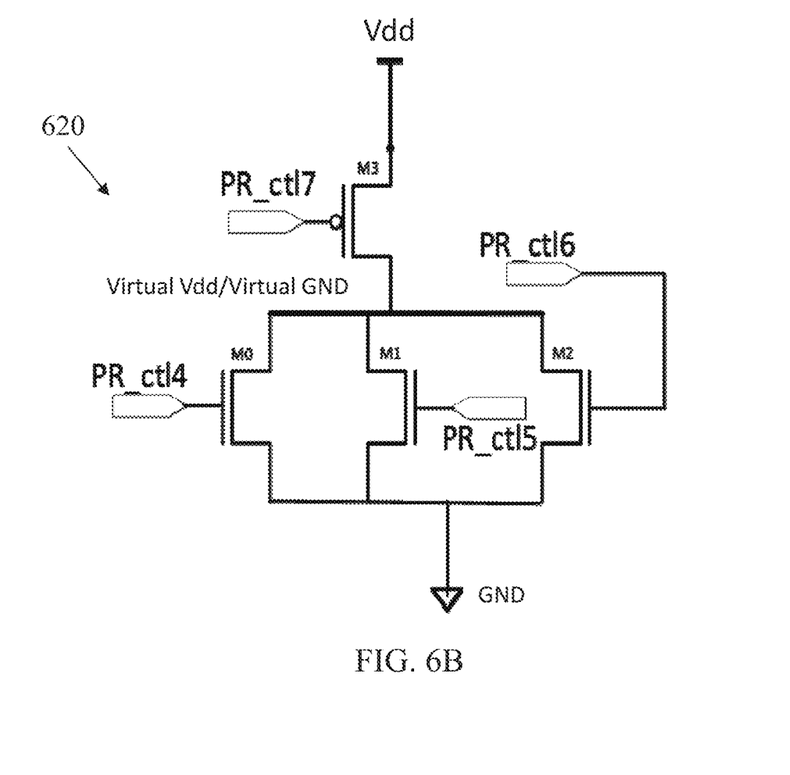
Figure 7A:
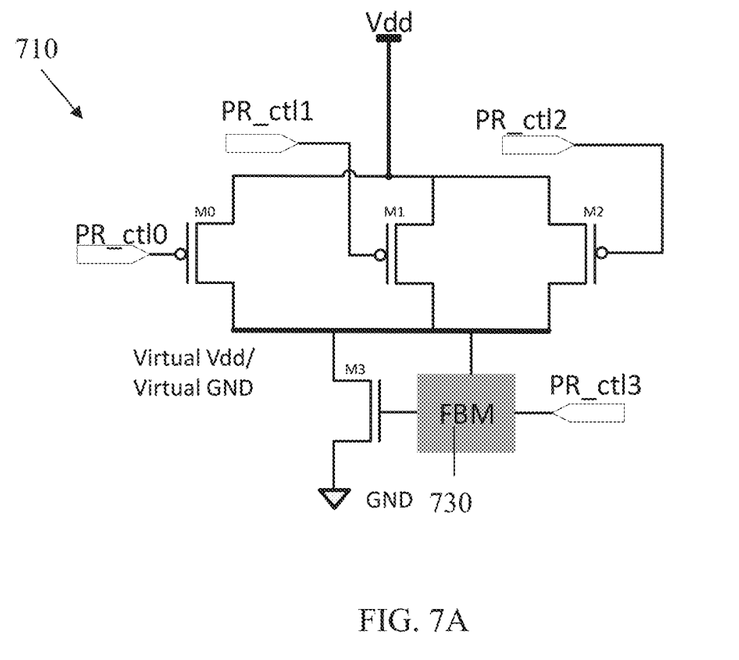
FIGS. 7A and 7B are simplified circuit diagrams of a pull-up LVR and a pull-down LVR respectively, according to further exemplary embodiments of the invention.

Exemplary embodiments of pull-up LVRs are presented in FIGS. 6A and 7A. Exemplary embodiments of pull-down LVRs are presented in FIGS. 6B and 7B. It is noted that other circuit implementations of LVRs are possible, and that the circuit implementation of the LVR may impact its response to control signals and the specificity of the virtual supply manipulation.

An analysis of information leakage in response to $VV_{dd}$ and $V_{GND}$ modulations was performed for an exemplary embodiment of the logic circuit under a side channel attack scenario. The analysis indicates that higher security performance is obtained when the delay module is connected to pull-up LVR(s) and the computation module is connected to pull-down LVR(s).

Optionally, the logic circuit is optimized to obtain a maximal or required security performance. The optimization may be performed by one or more of:

a) Selection of the number and types of the LVRs that are connected to the computation module and to the delay module;

b) Circuit layout of the LVR(s);

c) Use of feedback within the LVRs; and d) Control signal generation.

Pull-up LVRs and/or pull-down LVRs may be connected to the delay elements and to the computational module in various combinations. FIG. 5 shows the following LVR connections:

a) Pull-up LVR 530.1 regulates supply voltage $V_{dd}$ to delay module 520;

b) Pull-down LVR 530.2 regulates supply voltage $V_{dd}$ to delay module 520;

c) Pull-up LVR 540.1 regulates supply voltage $V_{dd}$ to computational module 510;

d) Pull-down LVR 540.2 regulates supply voltage $V_{dd}$ to computational module 510;

e) Pull-up LVR 550.1 regulates ground voltage GND to delay module 520;

f) Pull-down LVR 550.2 regulates ground voltage GND to delay module 520;

g) Pull-up LVR 560.1 regulates ground voltage GND to computational module 510;

h) Pull-down LVR 560.2 regulates ground voltage GND to computational module 510;

Alternate embodiments may include other combinations of LVR units and connections. Non-limiting examples of other combinations include:

a) LVRs providing virtual supply voltages to both the delay elements and the computational module (530.1, 530.2, 540.1 and 540.2);

b) LVRs providing a virtual supply voltage to the delay elements and virtual ground to the computational module (530.1, 530.2, 560.1 and 560.2).

Optionally an LVR (pull-up or pull-down) includes a feedback connection to one or more of the transistors composing the unit. This feedback allows for non-linear performance of the modulated supply voltage.

Reference is now made to FIGS. 6A and 6B, which are simplified circuit diagrams of a pull-up LVR and a pull-down LVR respectively, according to exemplary embodiments of the invention.

In the non-limiting embodiment of FIG. 6A, pull-up LVR 610 includes four transistors connected to respective control inputs PR_ct10 to PR_ct13. Random and/or data-dependent control signals are input to PR_ct10 to PR_ct13, thereby modulating the $V_{dd}$ voltage into the Virtual $V_{dd}$.

In the non-limiting embodiment of FIG. 6B, pull-down LVR 620 includes four transistors connected to respective control inputs PR_ct14 to PR_ct17. Random and/or data-dependent control signals are input to PR_ct14 to PR_ct17, thereby modulating the $V_{dd}$ voltage into the Virtual $V_{dd}$.

Figure 7B:
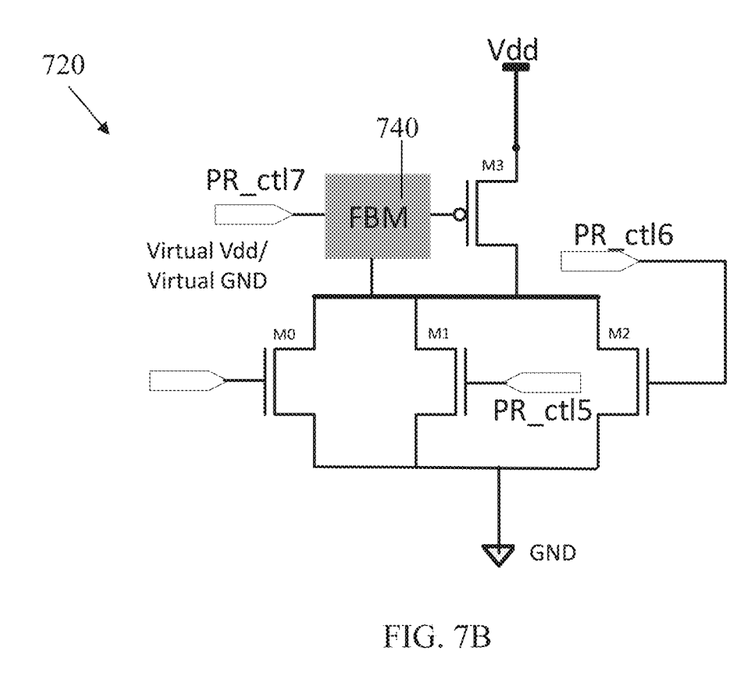

Reference is now made to FIGS. 7A and 7B, which are simplified circuit diagrams of a pull-up Integrated Voltage Regulator (LVR) and a pull-down LVR respectively, according to exemplary embodiments of the invention. Pull-up LVR 710 and pull-down LVR 720 correspond to pull-up LVR 610 and pull-down LVR 620, with the addition of feedback modules (FBM) 730 and 740 respectively. The feedback enables a non-linear response of the LVR with respect to the control signals. In an optional embodiment of FIG. 7A, the feedback is a direct connection of $VV_{dd}$ to the gate of the nMOS transistor. In an optional embodiment of FIG. 7B, the feedback is a direct connection of $VV_{dd}$ to the gate of the pMOS transistor.

Figure 8:
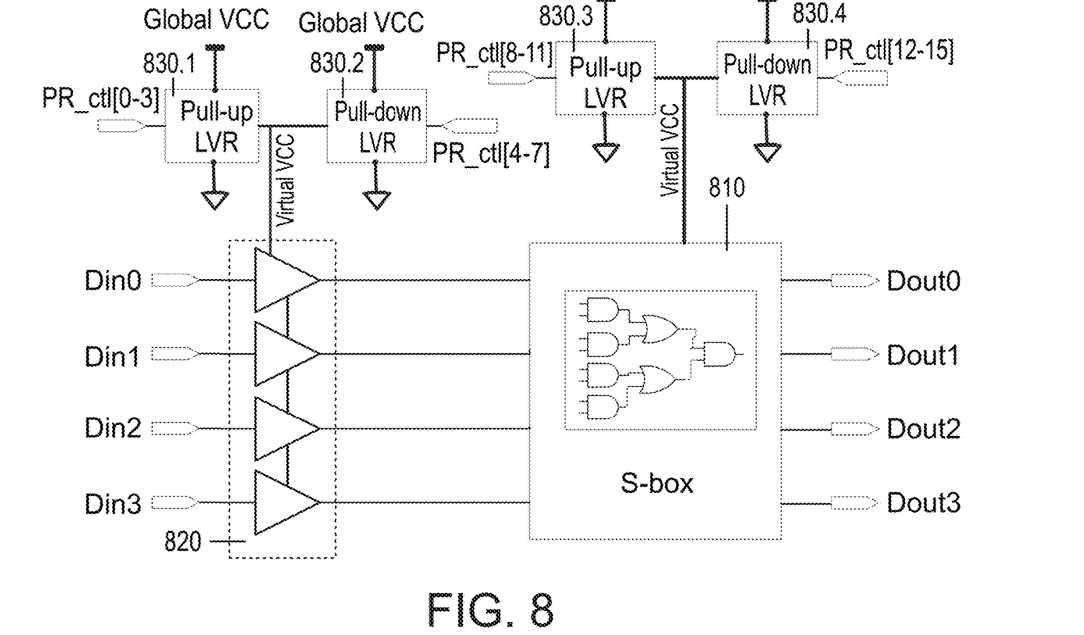
FIG. 8 is a simplified block diagram of a test setup for simulating secured and unsecured logic circuits according to exemplary embodiments of the invention.

Reference is now made to FIG. 8 is a simplified block diagram of a test setup for simulating secured and unsecured logic circuits, according to embodiments of the invention. LVRs 830.1-830.4 provide virtual $V_{dd}$ signals to computational module 810 and delay module 820. Computational module 810 in the simulated test case is a 4-bit S-box and delay module 820 includes four delay elements. Each LVR is controlled by a separate set of four control signals, which are generated by random bit generators (not shown). In order to avoid a floating $V_{dd}$ scenario, two of the controls should be static when the module is not disabled.

Figure 9:
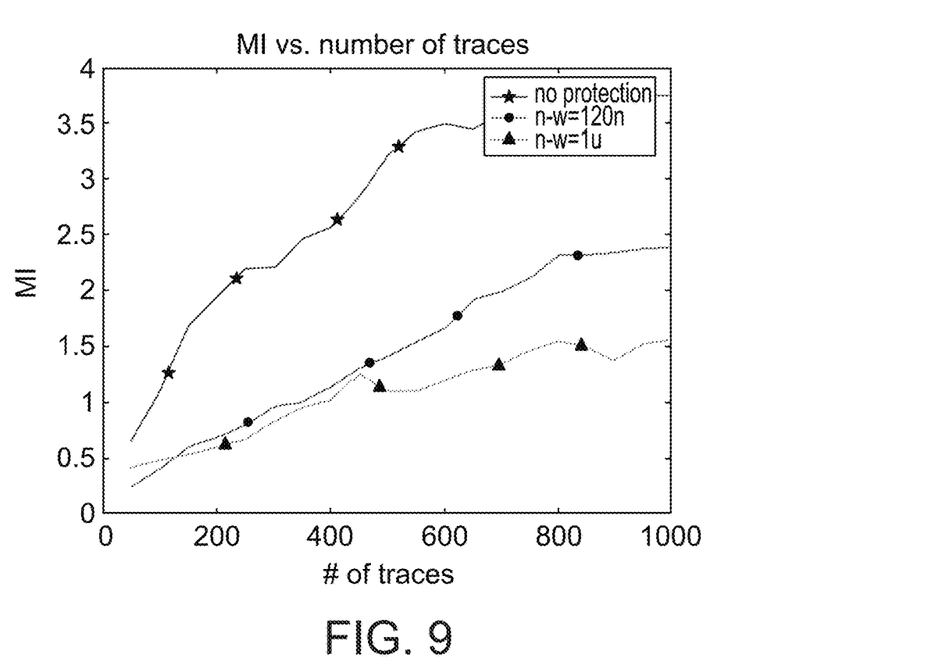
FIG. 9 presents simulation results for the unsecured and secured logic circuits.

Reference is now made to FIG. 9, which shows simulation results of the mutual information (MI) of an unsecured circuit (no protection) relative to the MI of secured circuits with n-transistor width of 120*n* and with n-transistor width of 1 u. Mutual information is an estimation of the amount of leaking information. As shown in FIG. 9 the MI of the unsecured circuit is significantly higher than the MI of the secured circuits, thereby demonstrating the benefits provided by the embodiments presented herein.

Figure 10:
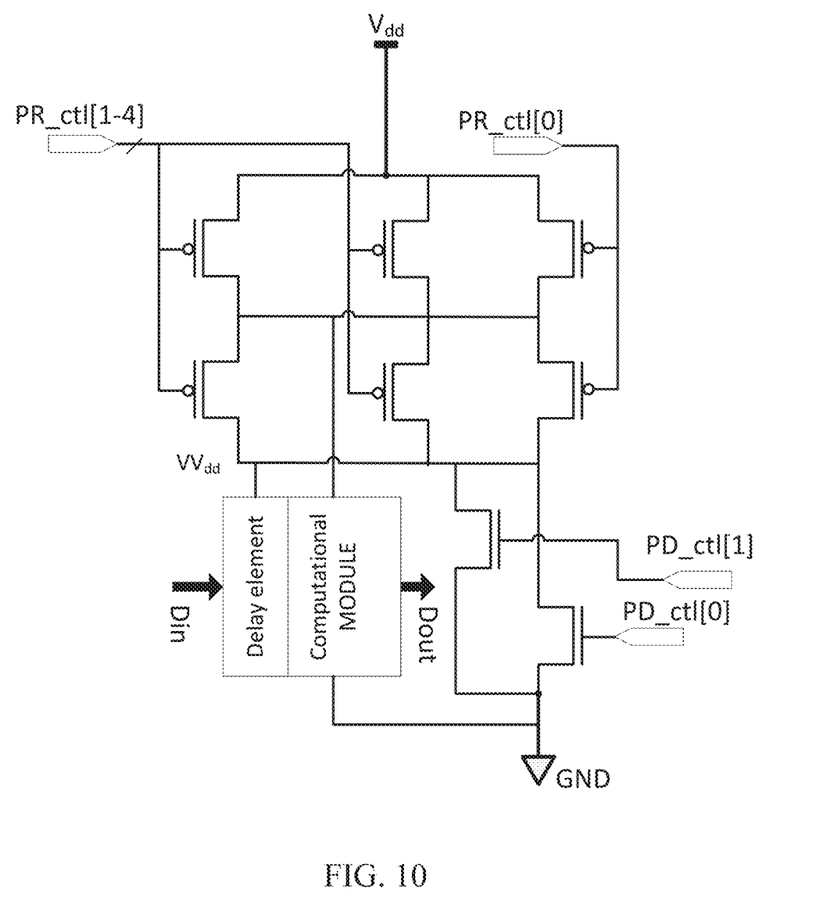
FIG. 10 is a simplified circuit diagram of a logic circuit with side channel information redistribution, according to a further exemplary embodiment of the invention.

Reference is now made to FIG. 10, which is a simplified circuit diagram of a logic circuit with side channel information redistribution, according to a further exemplary embodiment of the invention. The logic circuit of FIG. 10 includes an exemplary embodiment of an LVR. Control signals PR_ct1[0-4] and PD_ct1[0,1] perform power gating of supply voltage $V_{dd}$, thus generating two virtual supply voltages for the delay element and computational module respectively.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is expected that during the life of a patent maturing from this application many relevant logic circuits, logic elements, technologies for implementing logic circuits and logic circuit elements, delay elements, computational modules and random signal generators will be developed and the scope of the term logic circuit, logic element, delay element, computational module and random signal generator is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A logic circuit comprising:
   a voltage regulator adapted to generate a plurality of regulated supply voltages from at least one input supply voltage by controlling respective levels of said regulated supply voltages in accordance with varying control signals;
   a control signal generator associated with said voltage regulator, adapted to generate said control signals from at least one of: a data-dependent signal derived from at least one data signal in said logic circuit and a random signal;
   a delay module associated with said voltage regulator and powered by a first one of said regulated supply voltages, adapted to delay a plurality of input data signals, wherein a magnitude of said delay is dependent on said first regulated supply voltage; and
   a computational module associated with said voltage regulator and said delay module and powered by a second one of said regulated supply voltages, comprising a plurality of logic elements interconnected to perform a logic function on said delayed data signals.

2. A logic circuit according to claim 1, wherein said at least one input supply voltage comprises:
   an upper supply voltage;
   a lower supply voltage; and
   ground.

3. A logic circuit according to claim 1, wherein said voltage regulator generates said first and second regulated supply voltages independently.

4. A logic circuit according to claim 1, wherein said voltage regulator generates said first and second regulated supply voltages independently using different control signals.

5. A logic circuit according to claim 1, wherein said data-dependent signal comprises one of:
   an input data signal;
   a function of at least one input data signal;
   a signal at an internal node of said computational module; and
   a function of at least one signal at an internal node of said computational module.

6. A logic circuit according to claim 1, wherein said random signal comprises one of: random data and a function of random data.

7. A logic circuit according to claim 1, further comprising an internal random generator adapted to generate said random signal.

8. A logic circuit according to claim 1, wherein said random signal is input from an external random signal generator.

9. A logic circuit according to claim 1, wherein said control signal generator is adapted to enable and disable said voltage regulator in accordance with an external enable input signal, wherein when said voltage regulator is disabled said delay module and said computational module are powered by said input supply voltage.

10. A logic circuit comprising:
a data signal input adapted to input a plurality of data signals;
a computational module comprising a plurality of logic elements interconnected to perform a logic function on data signals;
a direct timing modulator associated with said data signal input and said computational module, adapted to modulate a propagation time of said data signals from said data signal input to said computational unit, in accordance with a first set of control signals; and
an amplitude and non-direct timing modulator associated with said computational module, adapted to modulate a processing time of data signals by said computational module and an amplitude of data signals propagating through said computational module, in accordance with a second set of control signals.

11. A logic circuit according to claim 10, wherein said first and second sets of control signals are disjoint.

12. A logic circuit according to claim 10, wherein said first and second sets of control signals are non-disjoint.

13. A logic circuit according to claim 10, wherein at least one of said control signals is a data-dependent signal derived from at least one data signal in said logic circuit.

14. A logic circuit according to claim 13, wherein said data-dependent signal comprises one of:
an input data signal;
a function of at least one input data signal;
a signal at an internal node of said computational module; and
a function of at least one signal at an internal node of said computational module.

15. A logic circuit according to claim 10, wherein at least one of said control signals is a random signal.

16. A logic circuit according to claim 15, further comprising an internal random generator adapted to generate said random signal.

17. A logic circuit according to claim 15, wherein said random signal is input from an external random signal generator.

18. A logic circuit according to claim 10, wherein said logic elements comprise at least one of:
a CMOS logic element;
a CMOS-based logic element;
a wave dynamic differential logic (WDDL) logic element;
a pass transistor logic (PTL) logic element; and
a biological computation logic element.

* * * * *